(12) United States Patent
Cho

(10) Patent No.: US 11,514,413 B2
(45) Date of Patent: Nov. 29, 2022

(54) METHOD AND SYSTEM FOR PROVIDING REMITTANCE FUNCTION BY RECOGNIZING CONTENT OF A MESSAGE IN A MESSENGER APPLICATION WITH REMITTANCE FUNCTION

(71) Applicant: LINE Pay Corporation, Toyko (JP)

(72) Inventor: Sun-Haeng Cho, Seongnam-si (KR)

(73) Assignee: LINE PAY CORPORATION, Tokyo (JP)

( * ) Notice: Subject to any disclaimer, the term of this patent is extended or adjusted under 35 U.S.C. 154(b) by 281 days.

(21) Appl. No.: 16/371,278

(22) Filed: Apr. 1, 2019

(65) Prior Publication Data
US 2019/0303889 A1    Oct. 3, 2019

(30) Foreign Application Priority Data

Apr. 3, 2018 (KR) .................. 10-2018-0038602

(51) Int. Cl.
| | | |
|---|---|---|
| G06Q 20/10 | (2012.01) | |
| G06Q 20/40 | (2012.01) | |
| H04L 51/04 | (2022.01) | |
| H04L 65/403 | (2022.01) | |

(52) U.S. Cl.
CPC .......... *G06Q 20/10* (2013.01); *G06Q 20/401* (2013.01); *H04L 51/04* (2013.01); *H04L 65/403* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 10,423,948 B1* | 9/2019 | Wilson | G06Q 20/386 |
| 2008/0177659 A1 | 7/2008 | Lacey et al. | |
| 2014/0207679 A1* | 7/2014 | Cho | G06Q 20/3229 |
| | | | 705/44 |
| 2015/0127526 A1 | 5/2015 | Ye et al. | |
| 2016/0104159 A1* | 4/2016 | Butterfield | G06Q 20/223 |
| | | | 705/44 |

(Continued)

FOREIGN PATENT DOCUMENTS

| | | |
|---|---|---|
| CN | 105376412 A | 3/2016 |
| CN | 106506322 A | 3/2017 |

(Continued)

OTHER PUBLICATIONS

Sarah Perez, "Facebook Messenger now supports group payments", Apr. 11, 2017 (Year: 2017).*

(Continued)

*Primary Examiner* — Jacob C. Coppola
*Assistant Examiner* — Timothy Paul Sax
(74) *Attorney, Agent, or Firm* — Harness, Dickey & Pierce, P.L.C.

(57) ABSTRACT

A remittance processing method includes recognizing an amount of money in a message being input into a chatroom of a messenger run on an electronic device, calling a remittance function to the chatroom in response to the amount of money being recognized in the message, and processing a remittance transaction to another user in the chatroom as a remittance target with respect to the amount of money, in response to a remittance request from a user of the electronic device.

22 Claims, 12 Drawing Sheets

(56) References Cited

U.S. PATENT DOCUMENTS

| | | | |
|---|---|---|---|
| 2016/0117666 A1 | 4/2016 | Davis et al. | |
| 2016/0117670 A1* | 4/2016 | Davis | G06Q 20/386 |
| | | | 705/39 |
| 2016/0125368 A1 | 5/2016 | Grassadonia et al. | |
| 2016/0132860 A1* | 5/2016 | Ko | G06Q 20/10 |
| | | | 705/39 |
| 2016/0171478 A1* | 6/2016 | Kwon | G06Q 20/321 |
| | | | 705/44 |
| 2016/0171481 A1 | 6/2016 | McElmurry, IV et al. | |
| 2016/0180316 A1 | 6/2016 | Wang et al. | |
| 2016/0224967 A1 | 8/2016 | Davis et al. | |
| 2017/0324586 A1* | 11/2017 | Kim | H04L 63/0407 |
| 2018/0004398 A1* | 1/2018 | Zhong | G06Q 10/1093 |
| 2018/0032999 A1* | 2/2018 | Mohandas | G06Q 20/386 |
| 2018/0096351 A1* | 4/2018 | Dahn | G06Q 20/386 |
| 2018/0239770 A1* | 8/2018 | Ghotbi | H04L 51/046 |
| 2018/0330346 A1* | 11/2018 | Grassadonia | G06Q 20/40 |
| 2018/0335928 A1* | 11/2018 | Van Os | G06F 3/04817 |

FOREIGN PATENT DOCUMENTS

| | | |
|---|---|---|
| KR | 10-2002-0023372 A | 3/2002 |
| KR | 10-2016-0057025 A | 5/2016 |
| KR | 10-2017-0074855 A | 6/2017 |
| KR | 10-1758030 B1 | 7/2017 |
| TW | 201407524 A | 2/2014 |
| WO | WO-2017/072589 A2 | 5/2017 |

OTHER PUBLICATIONS

Meta, "Send Money to Friends in Messenger", Mar. 17, 2015 (Year: 2015).*
Taiwanese Office Action dated Jun. 19, 2020 for corresponding Taiwanese Application No. 108111914.
Taiwanese Office Action dated Aug. 17, 2021 for corresponding Taiwanese Application No. 108111914.

* cited by examiner

METHOD AND SYSTEM FOR PROVIDING REMITTANCE FUNCTION BY RECOGNIZING CONTENT OF A MESSAGE IN A MESSENGER APPLICATION WITH REMITTANCE FUNCTION

CROSS-REFERENCE TO RELATED APPLICATION(S)

This U.S. non-provisional application claims the benefit of priority under 35 U.S.C. § 119 to Korean Patent Application No. 10-2018-0038602 filed on Apr. 3, 2018, in the Korean Intellectual Property Office (KIPO), the entire contents of which are incorporated herein by reference.

BACKGROUND

Field

One or more example embodiments relate to technology for providing a remittance function in a messenger application.

Description of Related Art

An instant messenger, a general communication tool, is software configured to transmit and receive messages or data in real time, and allows a user to register other users to chat with in the messenger (e.g., messenger application, etc.) and exchange messages with a user in a user list in real time.

Such a messenger supports a function to share a variety of information, such as photos, videos, files, contacts, locations, and schedules between users through a chatroom, and recently supports, in addition to the above function, a remittance function to remit a desired amount of money between users in the messenger.

For example, a conventional financial transaction system and method is known to use an instant messenger that allows a financial transaction (payment) such as a remittance or billing to a user in the instant messenger.

SUMMARY

One or more example embodiments provide a method, apparatus, system, and/or non-transitory computer readable medium that may automatically provide a remittance function when an amount of money is included in content of a message input into a chatroom of a messenger application with a remittance function.

One or more example embodiments provide a method, apparatus, system, and/or non-transitory computer readable medium that may recognize a number included in a message as an amount of money, and immediately remit the amount of money to a sender of the message when the number is included in content of the message in a chatroom of a messenger with a remittance function.

According to an aspect of at least one example embodiment, there is provided a remittance processing method performed by an electronic device including at least one processor configured to execute computer-readable instructions stored in a memory, the remittance processing method including generating, by the at least one processor, a user interface (UI) associated with a chatroom of a messenger application, the chatroom including a first user and a second user; receiving, by the at least one processor, a message input by the first user into the chatroom UI; analyzing, by the at least one processor, content of the input message; recognizing, by the at least one processor, an amount of money included in the message based on results of the analysis; generating, by the at least one processor, a remittance function in response to the amount of money being recognized in the message, the generating including displaying a user interface (UI) of the remittance function in a UI of the chatroom; and processing, by the at least one processor, a remittance transaction to a second user in the chatroom as a remittance target with respect to the amount of money in response to a remittance request from the first user on the UI of the remittance function.

The recognizing may include recognizing the amount of money by recognizing context in the content of the message being input into an input box of the chatroom UI.

The recognizing may include recognizing the amount of money by recognizing a remittance function trigger in the content of the message being input into an input box of the chatroom, the remittance function trigger including a specific sign or keyword indicating a currency unit in the message.

The generating may include displaying a UI for a remitting transaction to transfer the amount of money to the remittance target, and displaying a UI for a remittance requesting transaction in the chatroom, the remittance requesting transaction requesting the amount of money from the remittance target.

The generating may include displaying a user list associated with the first user on the messenger application, the user list used to select at least one user of the plurality of users in the chatroom as the remittance target, and the chatroom is a group chatroom and includes a plurality of users, the plurality of users including at least the first user and the second user.

The processing may include specifying the second user in the chatroom as the remittance target, the chatroom being an individual chatroom including the first user and the second user; and processing a remitting transaction to transfer the amount of money to the specified remittance target, or a remittance requesting transaction to request the amount of money from the specified remittance target.

The processing may include receiving a selection of at least one user of a plurality of users in the chatroom as the remittance target, the chatroom being a group chatroom and including at least three users; and processing a remitting transaction to transfer the amount of money to the selected remittance target, or a remittance requesting transaction to request the amount of money from the selected remittance target.

The remittance processing method may further include receiving, by the at least one processor, a selection by the first user of a specific message from among a plurality of messages included in the chatroom; generating, by the at least one processor, the remittance function in the chatroom in response to the selected message including a number; and processing, by the at least one processor, a remittance transaction to a user who sent the selected message as the remittance target with respect to an amount of money corresponding to the number included in the selected message in response to a remittance request from the first user.

The remittance processing method may further include hyperlinking, by the at least one processor, the number included in the selected message, the hyperlinking including recognizing the hyperlinked number as an amount of money to be remitted.

The remittance processing method may further include receiving, by the at least one processor, a selection by the first user of a specific message from among a plurality of messages included in the chatroom, generating, by the at least one processor, the remittance function in the chatroom based on the selected message, and processing, by the at least one processor, a remittance transaction to a user who sent the selected message as the remittance target in response to a remittance request from the first user, the processing including transmitting the remittance transaction to an external financial institution associated with the second user using an account associated with the messenger application established with the external financial institution associated with the second user on a private network associated with the external financial institution, the transmitted remittance transaction being encrypted.

According to an aspect of at least one example embodiment, there is provided a non-transitory computer-readable recording medium storing computer-readable instructions that, when executed by at least one processor, cause the at least one processor to perform the remittance processing method.

According to an aspect of at least one example embodiment, there is provided an electronic device including a memory configured to store computer-readable instructions; and at least one processor configured to connect to the memory and to execute the computer-readable instructions to generate a user interface (UI) associated with a chatroom of a messenger application, the chatroom including a first user and a second user, receive a message input by the first user into the chatroom UI, analyze content of the message, recognize an amount of money included in the message based on results of the analysis, generate a remittance function to the chatroom in response to the amount of money being recognized in the message, the generating including displaying a user interface (UI) of the remittance function in a UI of the chatroom, and process a remittance transaction to a second user in the chatroom as a remittance target with respect to the amount of money in response to a remittance request from the first user, the processing including transmitting the remittance transaction to an external financial institution associated with the second user using an account associated with the messenger application established with the external financial institution associated with the second user on a private network associated with the external financial institution, the transmitted remittance transaction being encrypted.

According to some example embodiments, it is possible to reduce a number of operations for remittance processing, thereby increasing the security of the remittance processing by reducing the number of times that a user's confidential financial information is transferred over a network, and reducing the amount of processing and memory resources consumed. Further, according to some example embodiments, it is possible to provide an improved user convenience by immediately providing a remittance function when an amount of money is included in content of a message input into a chatroom of a messenger with a remittance function.

Also, according to some example embodiments, it is possible to reduce a number of operations for remittance processing and to provide an improved user convenience by providing a function of recognize a number included in a message as an amount of money, and immediately remitting the amount of money to a sender of the message when the number is included content of the message in a chatroom of a messenger with a remittance function.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
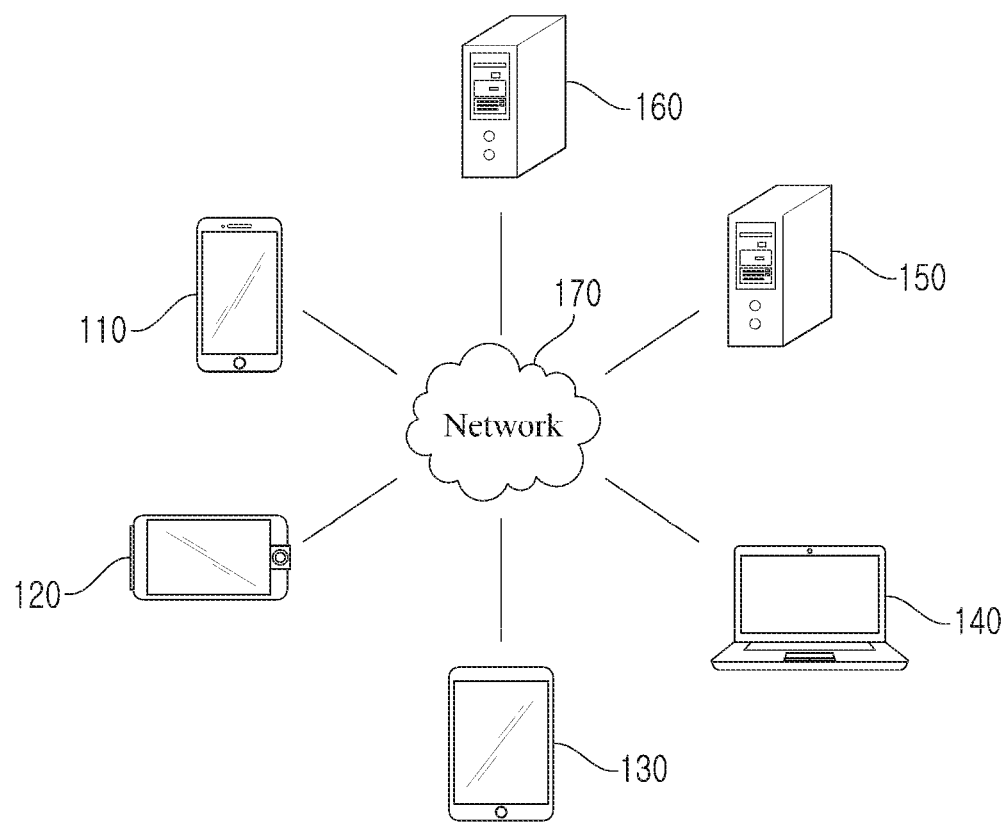
FIG. 1 illustrates an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, etc.), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for providing a remittance function in a messenger (e.g., a messenger application, etc.).

The example embodiments disclosed herein may recognize message content and may automatically provide a remittance function using a messenger (e.g., a messenger application, etc.) to which the remittance function is installed and may achieve many advantages in terms of convenience, security of confidential financial information, computer resource efficiency, time saving, and cost reduction.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, the number of electronic devices, the number of servers, and/or the number of networks are not limited thereto.

Each of the plurality of electronic devices 110, 120, 130, and 140 may be a fixed terminal or a mobile terminal configured as a computer apparatus. For example, the plurality of electronic devices 110, 120, 130, and 140 may be a smartphone, a mobile phone, a personal navigation device, a computer, a laptop computer, a digital broadcasting terminal, a personal digital assistant (PDA), a portable multimedia player (PMP), a tablet personal computer, a game console, a wearable device, an Internet of Things (IoT) device, a virtual reality (VR) device, and an augmented reality (AR) device, etc. For example, although FIG. 1 illustrates the shape of a smartphone as an example of the electronic device 110, the electronic device 110 may refer to one of various physical computer systems capable of communicating with other electronic devices 120, 130, and 140, and/or the servers 150 and 160 over the network 170 in a wired communication manner and/or in a wireless communication manner.

The communication scheme is not particularly limited and may include a communication method using a near field communication between devices as well as a communication method using a communication network, for example, a mobile communication network, the wired Internet, the wireless Internet, a broadcasting network, etc., which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, the server 150 may provide, as the first service, a service, for example, an instant message service (IMS), desired by the corresponding application through the application as the computer program installed and executed on the plurality of electronic devices 110, 120, 130, and 140. As another example, the server 160 may provide, as the second service, a service that distributes a file for installing and executing the application to the plurality of electronic devices 110, 120, 130, and 140 as the second service.

Figure 2:
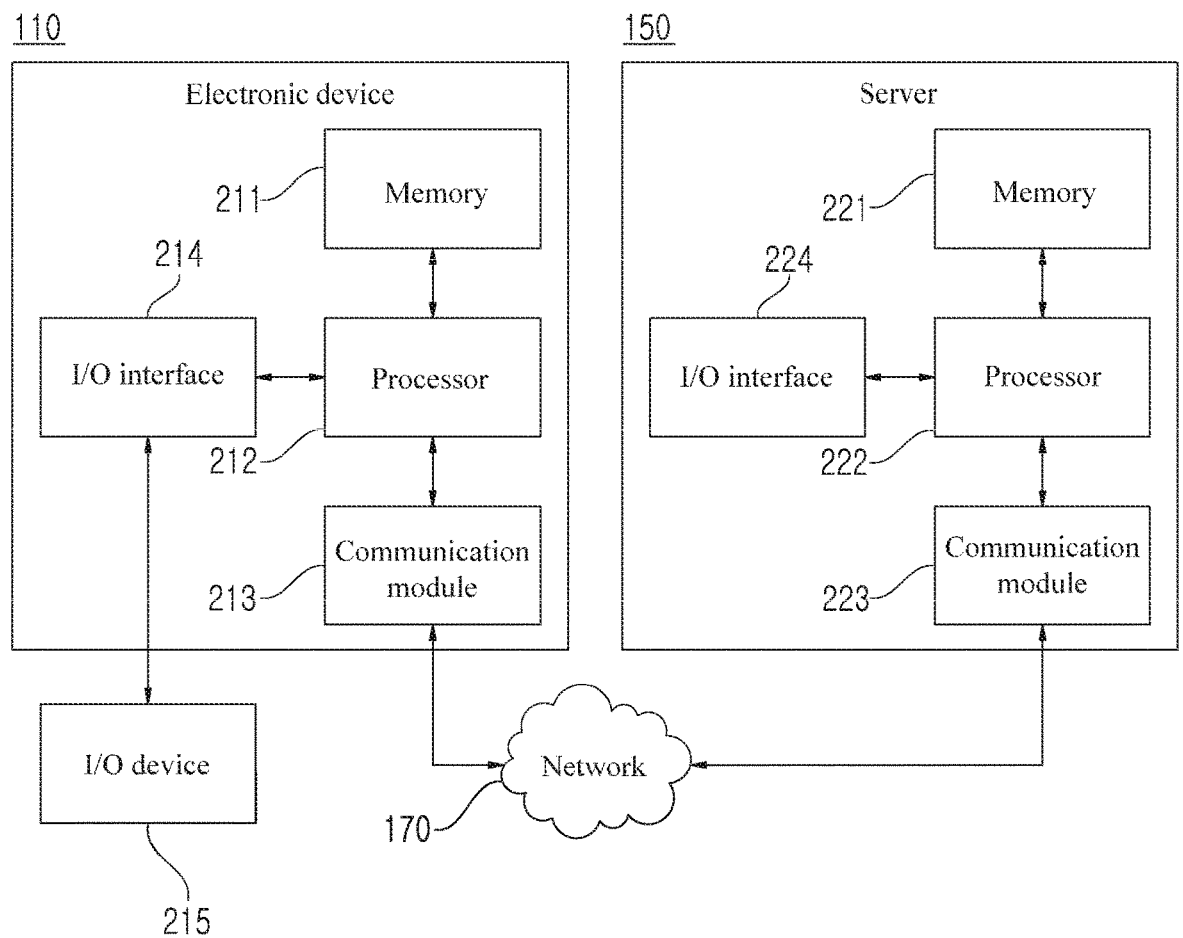
FIG. 2 illustrates an example of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers.

Referring to FIG. 2, the electronic device 110 may include a memory 211, at least one processor 212, a communication module 213, and an input/output (I/O) interface 214, etc., but the example embodiments are not limited thereto, and the server 150 may include a memory 221, at least one processor 222, a communication module 223, and an I/O interface 224. The memory 211, 221 may include a permanent mass storage device, such as random access memory (RAM), a read only memory (ROM), a disk drive, a solid state drive (SSD), and/or a flash memory, etc., as a non-transitory computer-readable storage medium. The permanent mass storage device such as ROM, SSD, flash memory, and disk drive, etc., may be included in the electronic device 110 or the server 150 as a permanent storage device separate from the memory 211, 221. Also, an OS or at least one program code, for example, a code for a browser installed and executed on the electronic device 110 or an application installed and executed on the electronic device 110 to provide a specific service, may be stored in the memory 211, 221. Such software components may be loaded from another non-transitory computer-readable storage medium separate from the memory 211, 221. The other non-transitory computer-readable storage medium may include a non-transitory computer-readable storage medium, for example, a floppy drive, a disk, a tape, a Blu-ray/DVD/CD-ROM drive, a memory card, etc. According to other example embodiments, software components may be loaded to the memory 211, 221 through the communication module 213, 223, instead of, or in addition to, the non-transitory computer-readable storage medium. For example, at least one program may be loaded to the memory 211, 221 based on a program, for example, the application, installed by files provided over the network 170 from developers or a file distribution system, for example, the server 160, which provides an installation file of the application.

The at least one processor 212, 222 may be configured to process computer-readable instructions of a computer program by performing basic arithmetic operations, logic operations, and I/O operations. The computer-readable instructions may be provided from the memory 211, 221 or the communication module 213, 223 to the processor 212, 222. For example, the at least one processor 212, 222 may be configured to execute received computer readable instructions in response to the program code stored in the storage device, such as the memory 211, 221.

The communication module 213, 223 may provide a function for communication between the electronic device 110 and the server 150 over the network 170, and may provide a function for communication with another electronic device, for example, the electronic device 120 or another server, for example, the server 160. Additionally, the communication module 213, 223 may encrypt the communication between the electronic device(s) and other device(s) over a network, such as communications between the electronic device 110 and the server 150 over the network 170, the electronic device 110 and the electronic device 120, and/or the server 150 and the server 160, etc. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium further includable in the electronic device 110.

The I/O interface 214 may be a device used to interface with at least one I/O device 215. For example, an input device may include a device, such as a keyboard, a mouse, a camera, a microphone, etc., and an output device may include a device, such as a display, a speaker, etc. As another example, the I/O interface 214 may be a device for interface with an apparatus in which an input function and an output function are integrated into a single function, such as a touchscreen, etc. The I/O device 215 may be configured as a single device with the electronic device 110, but is not limited thereto. Also, the I/O interface 224 of the server 150 may be a device for interfacing with an apparatus (not shown) for input or output that may be connected to the server 150 or included in the server 150. In detail, when processing instructions of the computer program loaded to the memory 211, the processor 212 of the electronic device 110 may display a service screen configured using data provided from the server 150 or the electronic device 120, or may display content on a display through the I/O interface 214, etc.

According to other example embodiments, the electronic device 110 and the server 150 may include a greater number of components than the number of components shown in FIG. 2. For example, the electronic device 110 may include at least a portion of the I/O device 215, or may further include other components, for example, a transceiver, a global positioning system (GPS) module, a camera, a variety of sensors, a database (DB), and the like. In detail, if the electronic device 110 is a smartphone, the electronic device 110 may be configured to further include a variety of components, for example, an accelerometer sensor, a gyro sensor, a camera module, various physical buttons, a button using a touch panel, an I/O port, a vibrating motor for vibration, etc., which are generally included in the smartphone.

Figure 3:
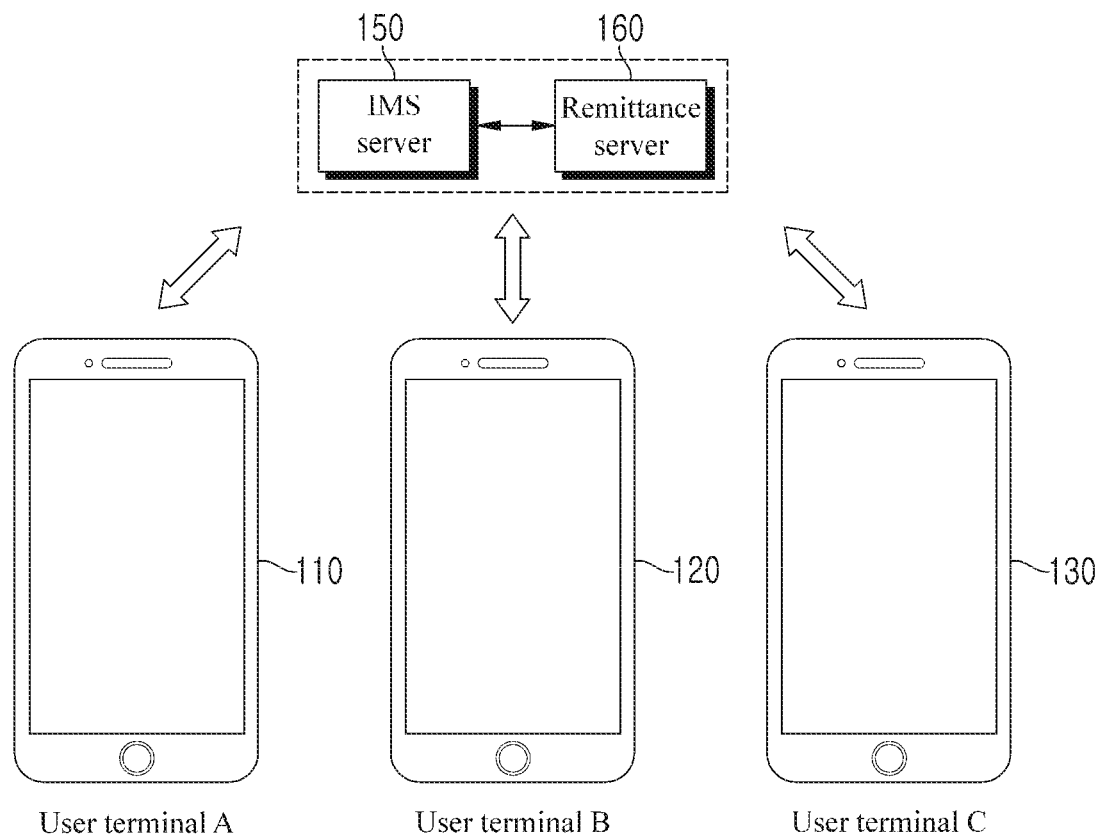
FIG. 3 illustrates an example of a system for processing a remittance using a messenger according to at least one example embodiment.

FIG. 3 illustrates an example of a system for processing a remittance using a messenger application according to at least one example embodiment.

The remittance processing system may include the server 150 (hereinafter, also referred to as an "IMS server") providing an instant message service to a plurality of user terminals, that is, the plurality of electronic devices, such as electronic devices 110, 120, and 130, etc., (hereinafter, also referred to as "user terminal A", "user terminal B", and "user terminal C", respectively), and the server 160 (hereinafter, also referred to as "remittance server") providing a remittance service through interoperation with the IMS server 150, however the example embodiments are not limited thereto.

The plurality of user terminals 110, 120, and 130, that is, the user terminal A 110, the user terminal B 120, and the user terminal C 130, may include a PC, etc., and/or a mobile computing device, such as a smartphone or a tablet, etc.

An instant messenger application may be installed on each of the plurality of user terminals 110, 120, and 130, and the plurality of user terminals 110, 120, and 130 may communicate with the IMS server 150. Users may form a social relationship between each other using the instant messenger application, and transmit/receive instant messages in real time, but are not limited thereto. Here, the social relationships may be represented as a friend list (e.g., buddy list, contact list, authorized communication partner list, etc.) of each of the users, and the plurality of user terminals 110, 120, and 130 may communicate with the IMS server 150 to synchronize information associated with chatrooms between two or more users, and the friend list, etc. The communication between the plurality of user terminals 110, 120, and 130 and the IMS server 150 may be encrypted or unencrypted.

When the instant message service is provided to the users, the users may utilize a remittance function provided on the instant messenger application to process a remittance. For example, a user may make a remittance to another user included in the friend list formed through the instant message service, or request a remittance from the other user through the instant message service. As described below, such remittance transactions of the users may occur in various situations, and at least one example embodiment may at least support the following two remittance transactions.

Examples of Remittance Transaction of User

Remitting transaction for a user to transfer a desired amount of money to at least one user; or Remittance requesting transaction for a user to request a desired amount of money from at least one user Further, when the instant message service is provided to the users, an IMS account and a remittance account are mapped to each other to process a remittance. That is, the IMS server 150 stores IMS accounts of the users, and the remittance server 160 stores remittance accounts of the users. Here, the IMS accounts and the remittance accounts are maintained to be mapped to each other.

Figure 4:
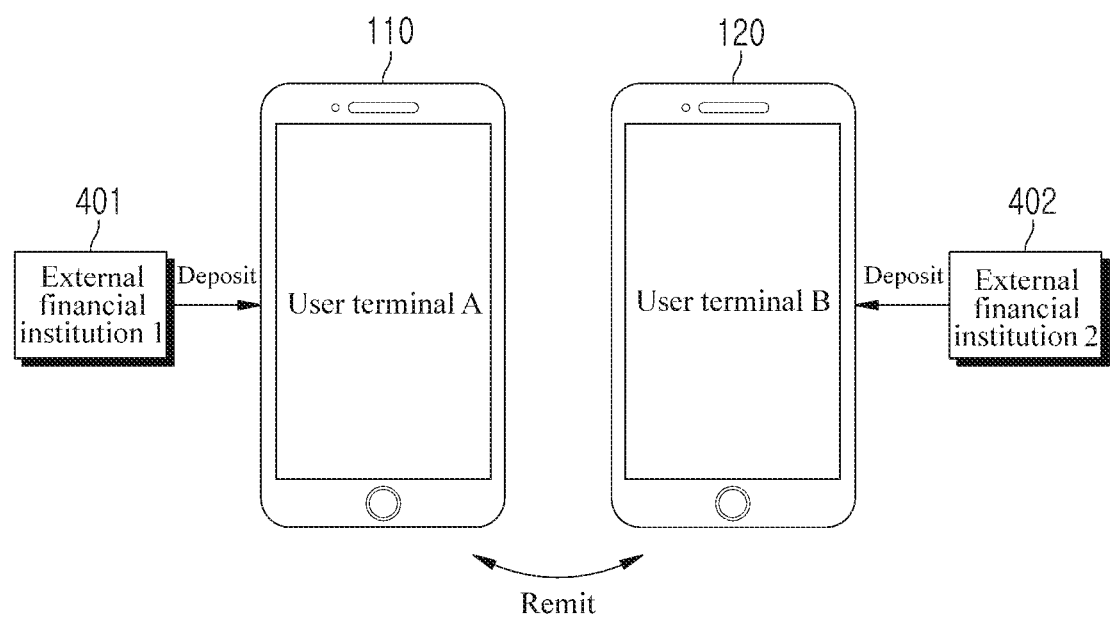
FIG. 4 illustrates an example of processing a remittance between users according to at least one example embodiment.

FIG. 4 illustrates an example of processing a remittance between users according to at least one example embodiment.

Referring to FIG. 4, the user terminal A 110 may perform a remittance transaction with the user terminal B 120 included in a friend list associated with user A in an IMS. For example, the user terminal A 110 may remit a desired amount within a value of user terminal A 110's (and/or the user A's) own remittance account to the user terminal B 120 (and/or the remittance account associated with the user B). For example, a portion or an entirety of the value of the remittance account of the user terminal A 110 may be transferred to the user terminal B 120 without help of an external financial institution (1) 401 and/or an external financial institution (2) 402. That is, in response to the portion or the entirety of the value of the remittance account of the user terminal A 110 being transferred to the user terminal B 120, a remittance processing system (including the IMS server 150 and the remittance server 160 of FIG. 3, etc.) updates the remittance account of the user terminal B 120. Although the user terminal B 120 desires to exchange the value received from the user terminal A 110 for a real currency, an interaction between the external financial institution (1) 401 and the external financial institution (2) 402 does not occur. In detail, the remittance processing system may have, similar to the user terminal B 120, a bank account at the external financial institution (2) 402 in which a bank account of the user terminal B 120 is registered (and/or a bank account associated with the user B, etc.), and a real currency is transmitted from the bank account of the remittance processing system to the bank account of the user terminal B 120 when the user terminal B 120 desires to exchange the value received from the user terminal A 110 for the real currency. Through the process described above, without a direct interaction between the external financial institution (1) 401 and the external financial institution (2) 402, the value transferred from the user terminal A 110 to the user terminal B 120 is provided to the user terminal B 120 as real currency, but the example embodiments are not limited thereto and the value transferred may be a digital currency, a crypto-currency, etc. Additionally, because a direct interaction between the external financial institution (1) 401 and the external financial institution (2) 402 is avoided, the security of the transfer of value between the user terminal A 110 and the user terminal B 120 is increased because the transmission of the financial account information of user A and/or user B is not transmitted over an open network. Instead, because the remittance processing system has an established account with both the external financial institution (1) 401 and the external financial institution (2) 402, the remittance processing system may transfer the value/funds from the account of user A to the remittance processing system's account on the private network of the external financial institution (1) 401, and then transfer the value/funds from the emittance processing system's account to the account of user B on the private network of the external financial institution (2) 402, thereby increasing the security of the transaction.

Further, the user terminal A 110 may request the user terminal B 120 to remit a desired amount. In addition, the user terminal A 110, B 120 may deposit funds to increase a value of a remittance account through the external financial institution (1) 401, (2) 402, and/or a third-party external institution, etc., and exchange the value of the remittance account for a real currency (and/or digital currency, crypto-currency, etc.) through the external financial institution (1) 401, (2) 402, etc.

The user terminal A 110, B 120 may also perform a payment procedure with respect to an online seller and/or an offline seller (not shown) using the remittance account. Here, the remittance account may be linked to a credit card or a bank account registered by the user terminal A 110, B 120, and a settlement procedure is performed through the external financial institution (1) 401, (2) 402 when a payment is completed.

Further, the user terminal A 110 and the user terminal B 120 may perform a remittance transaction such as a remitting transaction or a remittance requesting transaction within the value registered by the remittance account and/or a politically acceptable range, a desired range (e.g., a previously set user-defined range), etc. Here, a transfer of a value is completed between user terminals having remittance accounts within a remittance platform including the remittance server 160, independent of the external financial institution (1) 401, (2) 402, and/or other third-party or external institutions, etc. For example, when the user terminal A 110 remits $1 dollar on the remittance account to the user terminal B 120, funds may not be transferred from the external financial institution (1) 401 of the user terminal A 110 to the external financial institution (2) 402 of the user terminal B 120, but rather a value of $1 dollar may be transferred from the remittance account of the user terminal A 110 directly to the remittance account of the user terminal B 120. For example, the remittance account of user A and/or user B may be set up on the remittance platform and/or the remittance server 160, and the remittance platform and/or the remittance server 160 may have an account set on the external financial institution (1) 401, (2) 402, etc.

In particular, at least one example embodiment may provide a convenience function to allow an immediate remittance while chatting through a chatroom in a messenger. Hereinafter, an example of a method, apparatus, system, and/or non-transitory computer readable medium for automatically providing a remittance function by recognizing content of a message in a messenger application will be described in detail.

Figure 5:
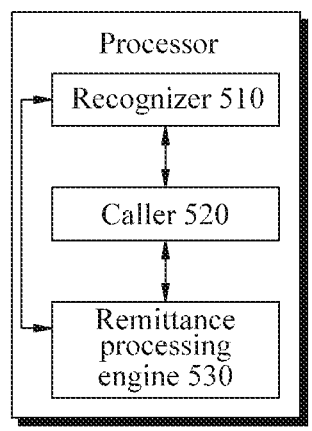
FIG. 5 illustrates an example of elements included in a processor of an electronic device according to at least one example embodiment.
Figure 6:
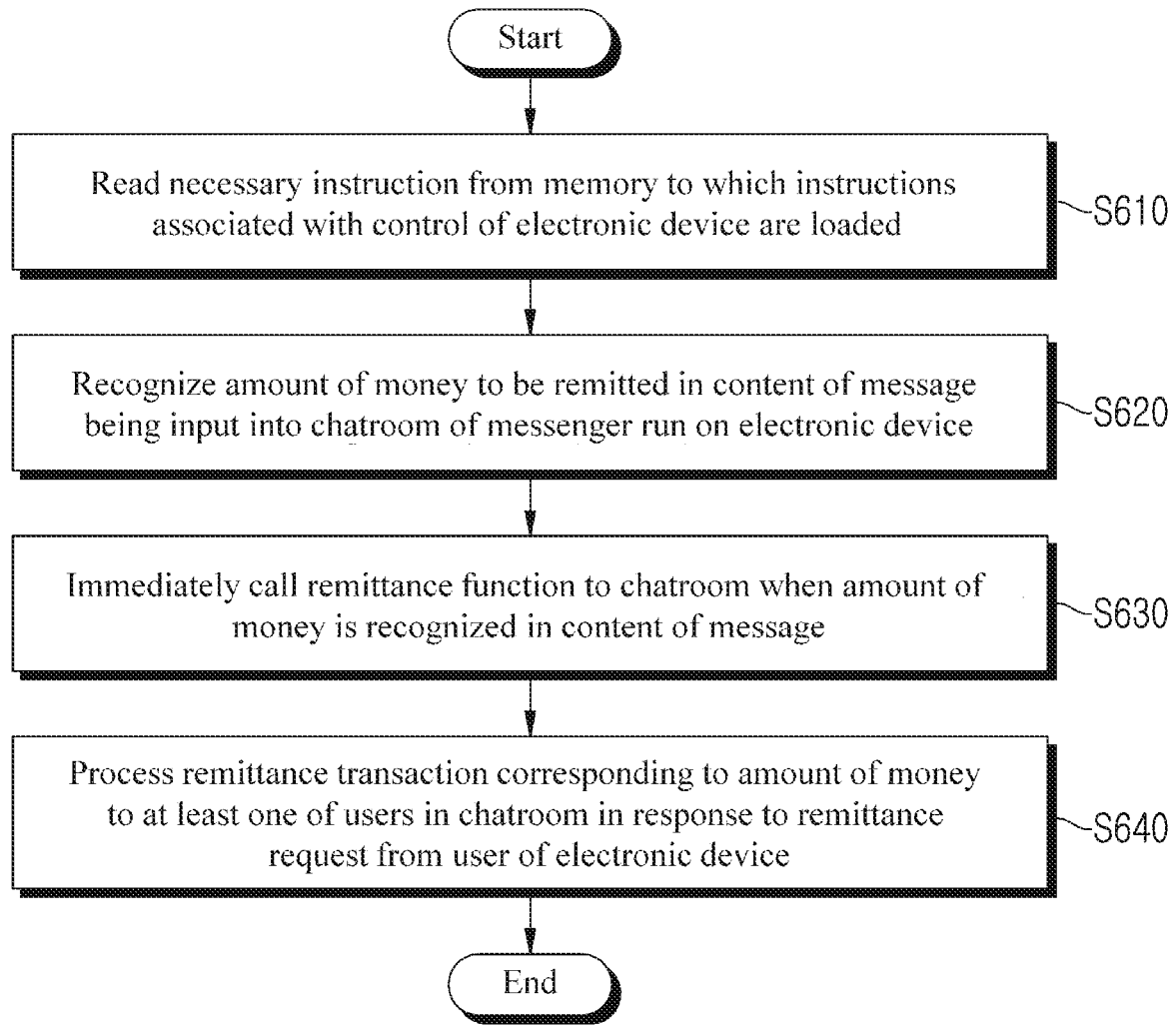
FIG. 6 is a flowchart illustrating an example of a method performed by an electronic device according to at least one example embodiment.

FIG. 5 illustrates an example of elements included in at least one processor of an electronic device according to at least one example embodiment, and FIG. 6 is a flowchart illustrating an example of a method performed by the electronic device according to at least one example embodiment.

A computer-implemented remittance processing system may be configured in the electronic device 110. For example, the remittance processing system may be configured in the form of an in-app system of an instant messenger application, and implemented to operate on a messenger (e.g., messenger application, chat application, SMS messaging application, videochat application, email application, etc.), and provide a remittance service using the messenger through interoperation with the server 150, 160, depending on an example.

Based on an instruction (e.g., computer readable instruction, etc.) provided by an application installed on the electronic device 110, the remittance processing system implemented in the electronic device 110 may perform a remittance processing method. To perform the remittance processing method of FIG. 6, the at least one processor 212 of the electronic device 110 may include a recognizer 510, a caller 520, and/or a remittance processing engine 530, etc., as elements of the at least one processor 212, as shown in FIG. 5. Depending on an example, the elements of the at least one processor 212 may be selectively included in or excluded from the at least one processor 212. Further, the elements of the at least one processor 212 may be separate or merged to represent functions of the at least one processor 212.

The at least one processor 212 and the elements of the at least one processor 212 may control the electronic device 110 to perform operations S610 through S640 of the remittance processing method of FIG. 6. For example, the at least one processor 212 and the elements of the at least one processor 212 may be implemented to execute special purpose instructions corresponding to operations S610 through S640 of the remittance processing method of FIG. 6, etc., according to at least one program code and OS code stored in the memory 211, thereby transforming the at least one processor 212 into a special-purpose processor.

Here, the elements of the processor 212 may be representations of different functions of the processor 212, performed by the processor 212 according to the instructions provided by the program code stored in the electronic device 110 (for example, instructions provided by an application run on the electronic device 110). For example, the recognizer 510 may be used as a functional representation of the processor 212 controlling the electronic device 110 based on the instructions described above such that the electronic device 110 may recognize content of a message input into a chatroom of the messenger. However, the example embodiments are not limited thereto, and the elements of the processor 212 may be hardware circuitry included in the processor 212, or a combination of hardware circuitry and software.

In operation S610, the processor 212 may read a necessary instruction (e.g., computer readable instruction, etc.) from the memory 211 to which instructions associated with control of the electronic device 110 are loaded. Here, the read instructions may include special purpose instructions to control the processor 212 to perform operations S620 through S640, which will be described below.

In operation S620, the recognizer 510 may recognize an amount of money to be remitted in content of a message being input into a chatroom of a messenger run on the electronic device 110. For example, when a message (e.g., instant message, chat message, videochat message, SMS message, email, etc.) to be transmitted is input into the chatroom through an input box of the chatroom, the recognizer 510 may recognize an amount of money being written as the message (and/or included in the text of the message, etc.) on the input box by recognizing context in content of the message being input. As another example, when a message to be transmitted is input into the chatroom through an input box of the chatroom, the recognizer 510 may recognize an amount of money being written as the message on the input box by recognizing a remittance function trigger, such as a specific sign, keyword, and/or other desired special character, etc. indicating a currency unit and/or a monetary value, for example, won, ₩, KRW, dollar, $, USD, etc.

In operation S630, the caller 520 may immediately call (e.g., generate) a remittance function to the chatroom when the amount of money is recognized in the content of the message. When the amount of money is written on the input box of the chatroom, the caller 520 may call (e.g., generate, display, open, etc.) a user interface (UI) of the remittance function such that the remittance function may be displayed in the user interface of the chatroom, thereby allowing the remittance function to be used immediately in the chatroom. That is, the caller 520 may immediately activate the remittance function when the message being written on the input box of the chatroom corresponds to an amount of money, specific sign, special character, keyword, etc., related to the remittance function, similar to a function to recommend a predictive word or a sticker, a type of emoji, corresponding to a keyword being input.

In operation S640, the remittance processing engine 530 may process a remittance transaction corresponding to the amount of money recognized in the content of the message to at least one of the users in the chatroom (e.g., at least one participant in the message session, communication session, email session, etc.) in response to a remittance request from the user of the electronic device 110. For example, the remittance processing engine 530 may automatically specify another user in the chatroom as a remittance target in response to the remittance request from the user through a remittance UI, and process a remitting transaction or a remittance requesting transaction with respect to the amount of money recognized in operation S620. As another example, the remittance processing engine 530 may receive, from the user, a selection of at least one remittance target from a list of users in the chatroom provided through the remittance UI, and process a remitting transaction or a remittance requesting transaction to the selected remittance target with respect to the amount of money recognized in operation S620.

Thus, the remittance processing system and the remittance processing method according to one or more example embodiments provide convenience such that a remittance function may be used immediately when an amount of money is included in content of a message to be transmitted being input into a chatroom of a messenger.

Figure 7:
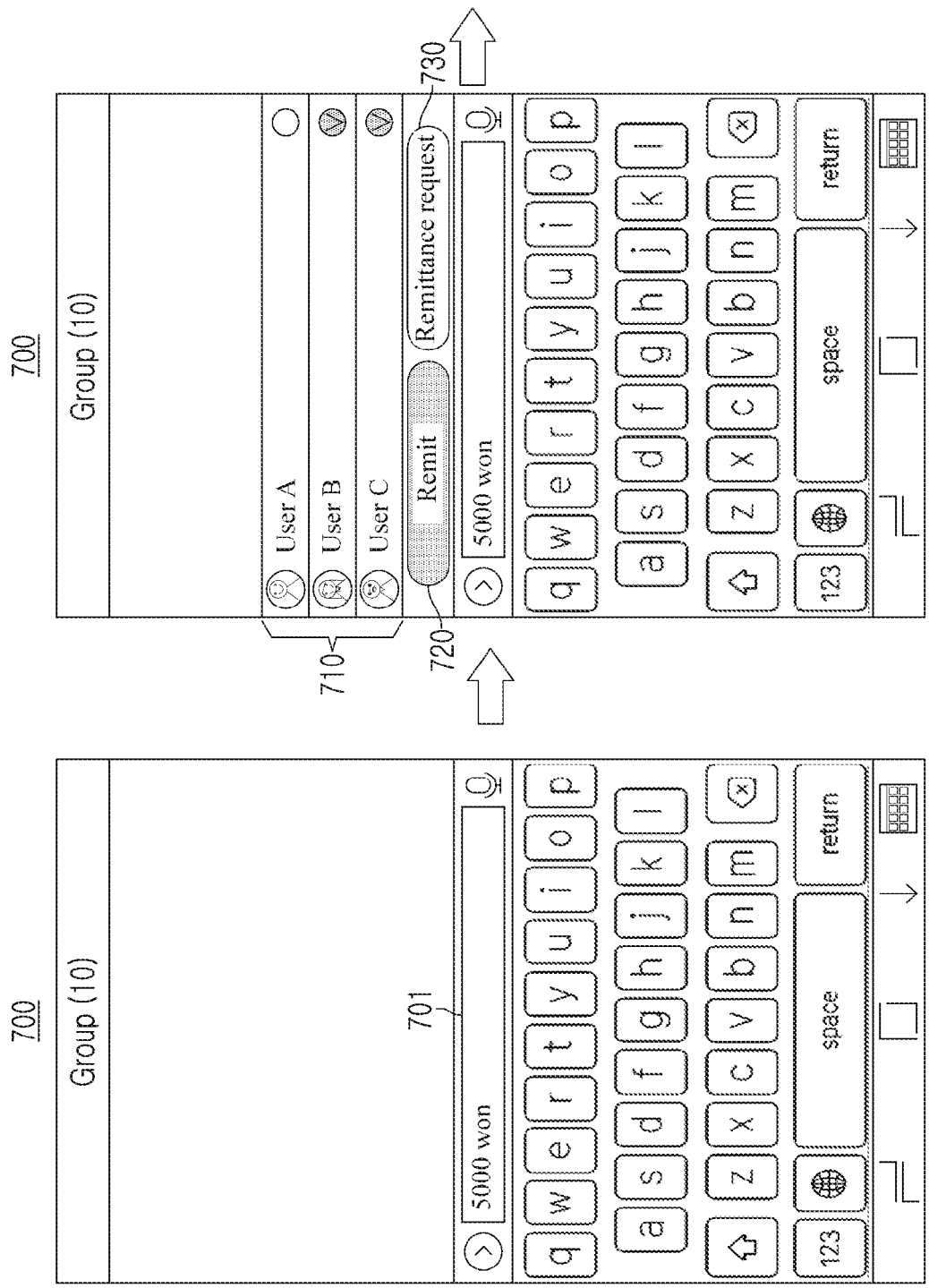
FIGS. 7 through 9 illustrate examples of processing a remittance according to at least one example embodiment.
Figure 8:
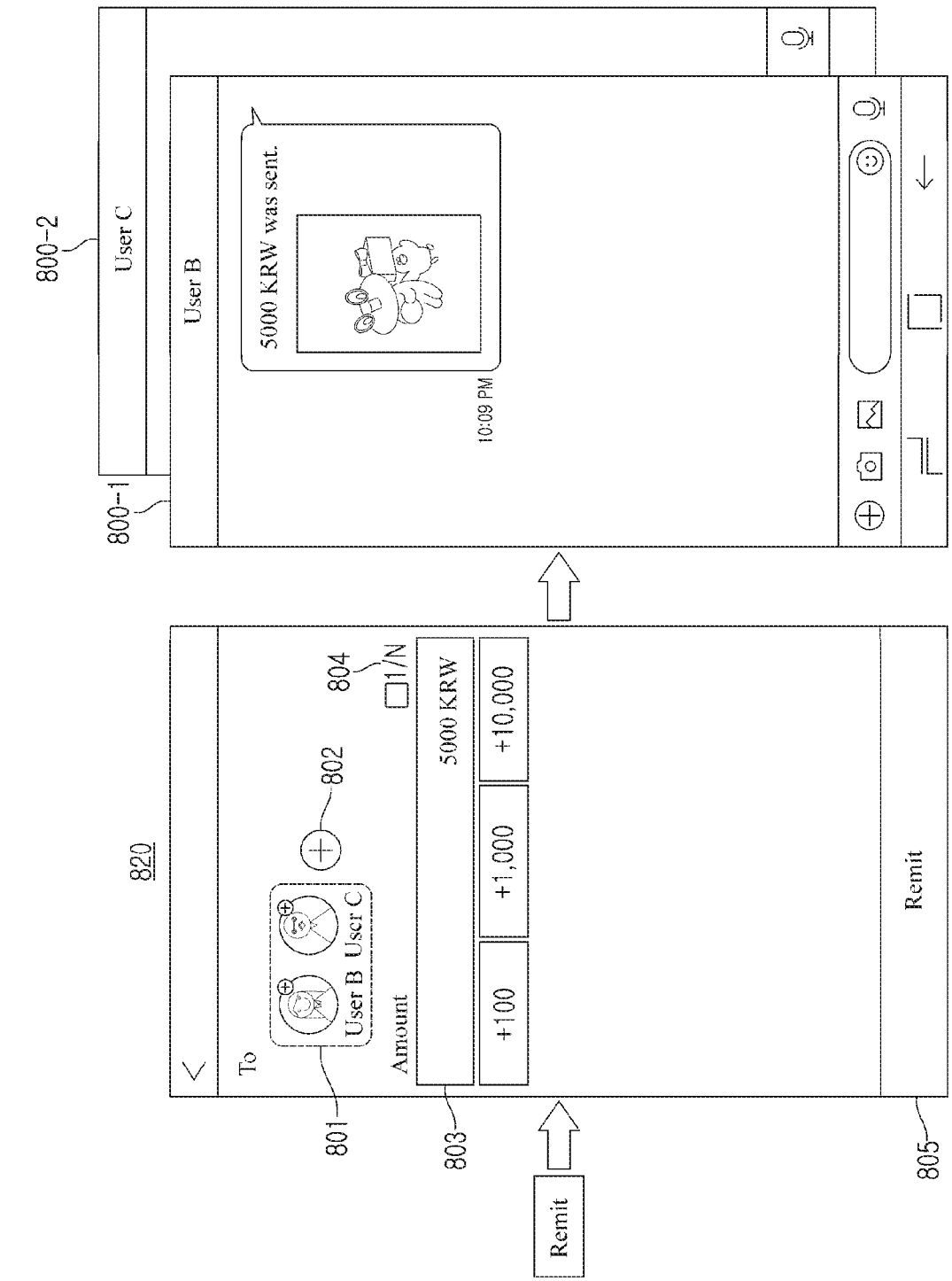
Figure 9:
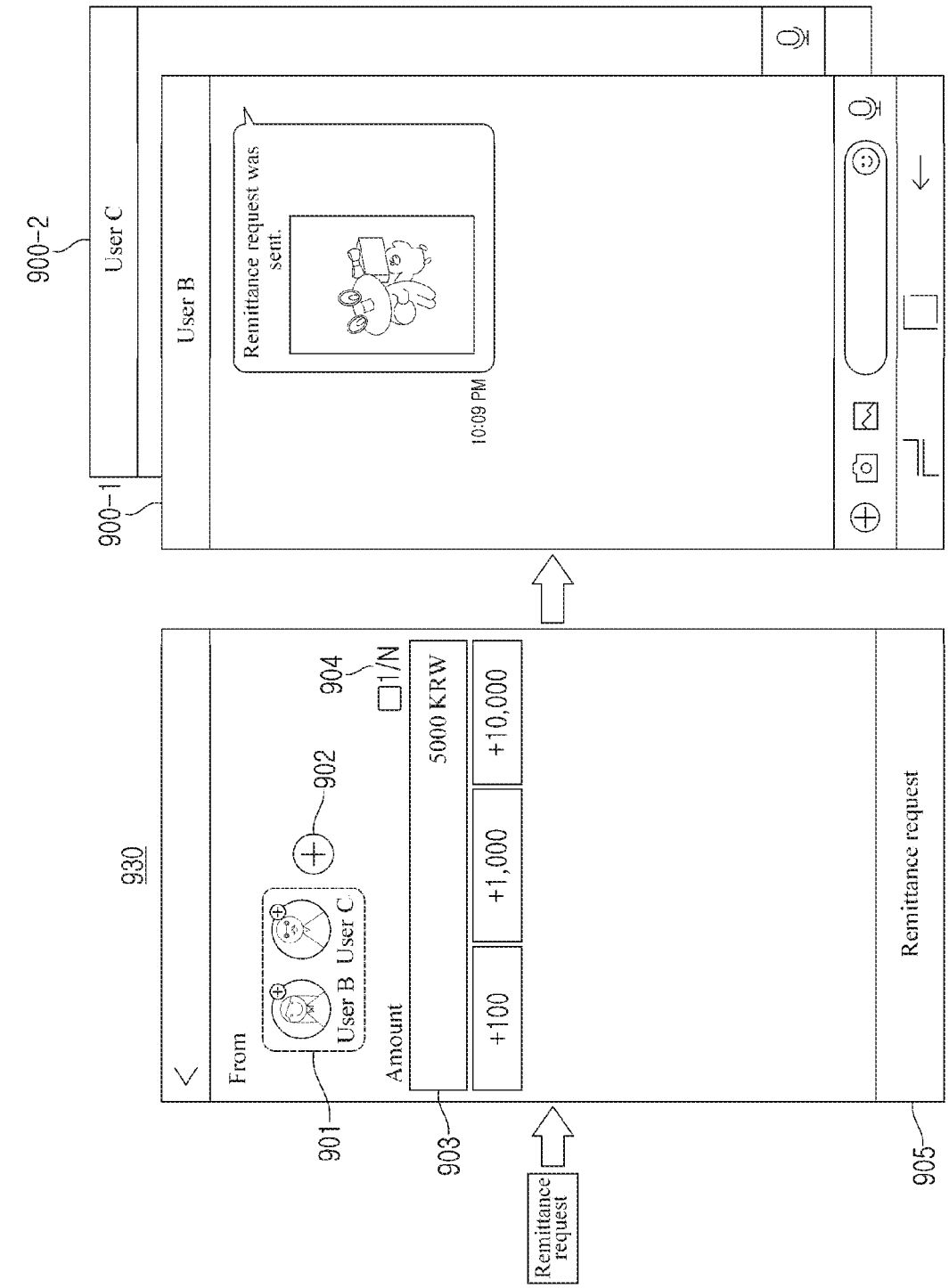

FIGS. 7 through 9 illustrate examples of processing a remittance according to at least one example embodiment.

FIG. 7 illustrates a messenger chatroom 700 in which ten users including the user of the electronic device 110 are participating, but the example embodiments are not limited thereto. Here, the messenger chatroom 700 may be a screen displayed on the electronic device 110, for example, a smartphone, etc., but the example embodiments are not limited thereto.

Referring to FIG. 7, when the user inputs an amount of money into a message input box 701 of the messenger chatroom 700, the processor 212 of the electronic device 110 may recognize the amount of money and automatically call a remittance UI (e.g., display the remittance UI, etc.) such that a remittance function may be used immediately. Here, the remittance UI may include a user list 710 to select at least one of users in the messenger chatroom 700 as a remittance target, a "remit" UI 720 for a remitting transaction to a remittance target, and a "remittance request" UI 730 for a remittance requesting transaction to a remittance target.

Here, when the messenger chatroom 700 is a group chatroom including at least three users, the user list 710 may be provided. When the messenger chatroom 700 is a 1:1 chatroom, the user list 710 may be omitted. When the user selects at least one user from the user list 710, the selected user may be specified as a remittance target. When the user does not select a user, all the users in the user list 710 may be specified as remittance targets.

When the amount of money is recognized in the text input by the user into the message input box 701, the processor 212 of the electronic device 110 may immediately provide a function to perform a remittance or a remittance request with respect to another user in the chatroom, and simultaneously terminate a flow to connect to the remittance function and hide the remittance UI by determining that there is no need for remittance when additional text is input into the message input box 701.

When the user selects at least one user from the user list 710 and inputs the "remit" UI 720, the processor 212 of the electronic device 110 may provide a remittance confirmation screen 820 to confirm remittance information, as shown in FIG. 8. The remittance confirmation screen 820 may be configured as a UI to confirm and/or edit an amount of money or a remittance target, and may include a list 801 of remittance targets specified as users to receive money, an "add" UI 802 to add a remittance target, an amount input box 803 to confirm or newly input an amount of money to be transferred, and/or a "split" UI 804 to split the amount of money input into the amount input box 803 by the number of users included in the remittance target list 801.

The remittance target list 801 may include separately deletable UIs respectively including remittance targets selected from the user list 710. When the "add" UI 802 is input, the user may access the user list 710 included in the messenger chatroom 700 again to add and/or edit a remittance target. The amount of money input into the message input box 701 of the messenger chatroom 700 may be input into the amount input box 803, and a UI for editing the amount and/or inputting a new amount may be included.

When the user inputs a "remit" UI 805 on the remittance confirmation screen 820, the processor 212 of the electronic device 110 may process a remitting transaction to remittance targets included in the remittance target list 801 with respect to the amount of money input into the amount input box 803. The processor 212 of the electronic device 110 may send a remittance message to the users to receive money in response to the remitting transaction. Here, the remittance message may be displayed in an individual chatroom 800-1, 800-2 of each remittance target. In addition, when the messenger chatroom 700 is a group chatroom, the remittance message may be displayed in the group chatroom, and even in the group chatroom, the remittance message may be delivered and displayed only to the user of the electronic device 110 and the remittance targets.

When the user selects at least one user from the user list 710 of FIG. 7 and inputs the "remittance request" UI 730, the processor 212 of the electronic device 110 may provide a remittance confirmation screen 930 to confirm remittance information, as shown in FIG. 9. The remittance confirmation screen 930 may be configured as a UI to confirm and/or edit an amount of money and/or a remittance target, and may include a list 901 of remittance targets specified as users to request money from, an "add" UI 902 to add a remittance target, an amount input box 903 to confirm and newly input an amount of money to be requested, and/or a split UI 904 to split the amount of money input into the amount input box 903 by the number of users included in the remittance target list 901.

Similarly, the remittance target list 901 may include separately deletable UIs respectively including remittance targets selected from the user list 710. When the "add" UI 902 is input (e.g., the user selects the "add" UI element 902, the user instructs/causes the performance of the add functionality, etc.), the user may access the user list 710 included in the messenger chatroom 700 again to add and/or edit a remittance target. The amount of money input into the message input box 701 of the messenger chatroom 700 may be input into the amount input box 903, and a UI for editing an amount and/or adding a new input amount may be included.

When the user inputs a "remittance request" UI 905 on the remittance confirmation screen 930, the processor 212 of the electronic device 110 may process a remittance requesting transaction to the remittance targets included in the remittance target list 901 with respect to the amount of money input into the amount input box 903. The processor 212 of the electronic device 110 may send a remittance message to the users to request money from the selected and/or targeted users in response to the remittance requesting transaction. Here, the remittance message may be displayed in an individual chatroom 900-1, 900-2 of each remittance target. In addition, when the messenger chatroom 700 is a group chatroom, the remittance message may be displayed in the group chatroom, and even in the group chatroom, the remittance message may be delivered and displayed only to the user of the electronic device 110 and the remittance targets.

In the past, when a need for remittance to another user arises while the user is chatting in a messenger, the user needed to leave the chatroom, separately execute a remittance function, search for another user that the user chatted with, set the other user as a remittance target, directly input an amount of money, and remit the amount of money, which required the user to perform many steps for remittance during chatting.

Herein, similar to providing a predictive word function or a sticker recommendation function with respect to a keyword being input, a remittance function may be executed immediately when an amount of money, specific sign, keyword, other desired special character, etc., is input into a message input box of a chatroom. Here, by automatically specifying another user that the user is currently chatting with as a remittance target and automatically inputting the amount of money input into the message input box as an amount of money to be received or transferred, the number of operations for processing a remittance may be reduced.

Figure 10:
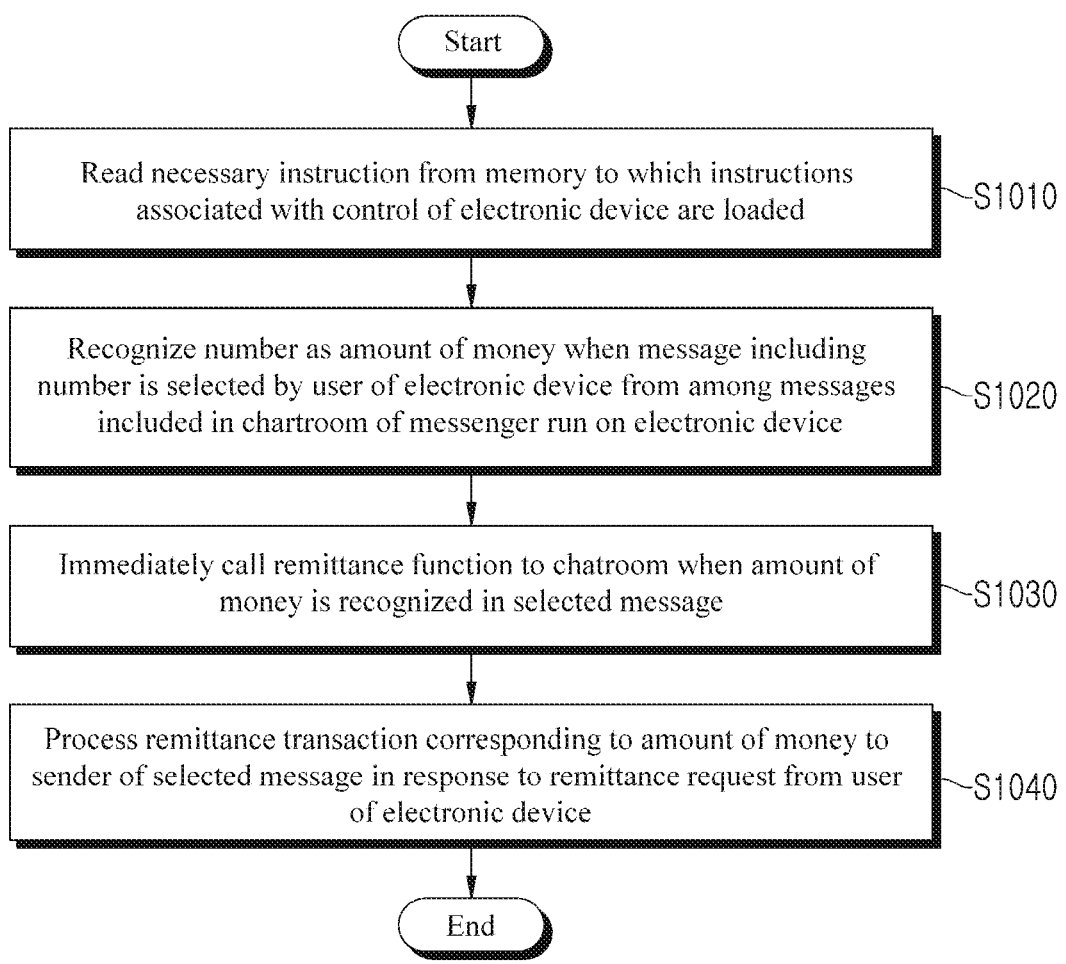
FIG. 10 is a flowchart illustrating another example of a method performed by an electronic device according to at least one example embodiment.

FIG. 10 is a flowchart illustrating another example of a method performed by an electronic device according to at least one example embodiment.

In operation 51010, the processor 212 may read a desired and/or necessary computer readable instruction from the memory 211 to which instructions associated with control of the electronic device 110 are loaded. Here, the read instructions may include special purpose instructions to control the processor 212 to perform operations S1020 through S1040, which will be described below.

In operation S1020, the recognizer 510 may recognize a number as an amount of money to be remitted, when a message including the number is selected by the user of the electronic device 110 from among messages included in a chartroom of a messenger run on the electronic device 110. When a chat message exchanged through the chatroom of the messenger includes a number, the recognizer 510 may hyperlink the number and recognize the hyperlinked number as an amount of money, but the example embodiments are not limited thereto. For example, according to at least one example embodiment, the recognizer 510 may analyze the text being input by a user into a body of a message of the messenger application and determine whether the text includes a remittance function trigger, e.g., a specific sign, keyword, and/or other desired special character associated with the remittance function, determine whether there is a number associated with the remittance function trigger (e.g., within a desired number of characters of the remittance function trigger, a numerical value on the same line/sentence/paragraph/etc. as the remittance function trigger, a numerical value included in the same message as the remittance function trigger, etc.), and then use the determined number associated with the remittance function trigger as the monetary value of the remittance operation.

In operation S1030, the caller 520 may immediately call a remittance function to the chatroom when the amount of money is recognized in the message selected by the user of the electronic device 110. In response to the user of the electronic device 110 selecting a specific message from among chat messages exchanged through the chatroom of the messenger, the caller 520 may call a UI of the remittance function such that the remittance function may be used immediately in the chatroom when a number is included in the selected message.

In operation S1040, the remittance processing engine 530 may process a remittance transaction corresponding to the amount of money recognized in the message to another user who sent the message selected by the user of the electronic device 110, that is, a message sender, as a remittance target in response to a remittance request from the user of the electronic device 110. That is, the remittance processing engine 530 may process a remittance transaction to another user who sent a chat massage including a number as a remittance target with respect to an amount of money corresponding to the number included in the chat message.

Thus, the remittance processing system and the remittance processing method consider a number in chat content exchanged through a chatroom of a messenger as an amount of money, thereby providing and/or increasing convenience such that a remittance function may be used immediately.

An example of executing a remittance function immediately in response to a message including a number being selected has been described above. However, the example embodiments are not limited thereto. An example of executing a remittance function unconditionally in response to a message being selected irrespective of presence of a number is also possible. Here, a remittance transaction may be processed by automatically specifying a sender of the selected message as a remittance target and receiving an input of an amount of money from the user.

Figure 11:
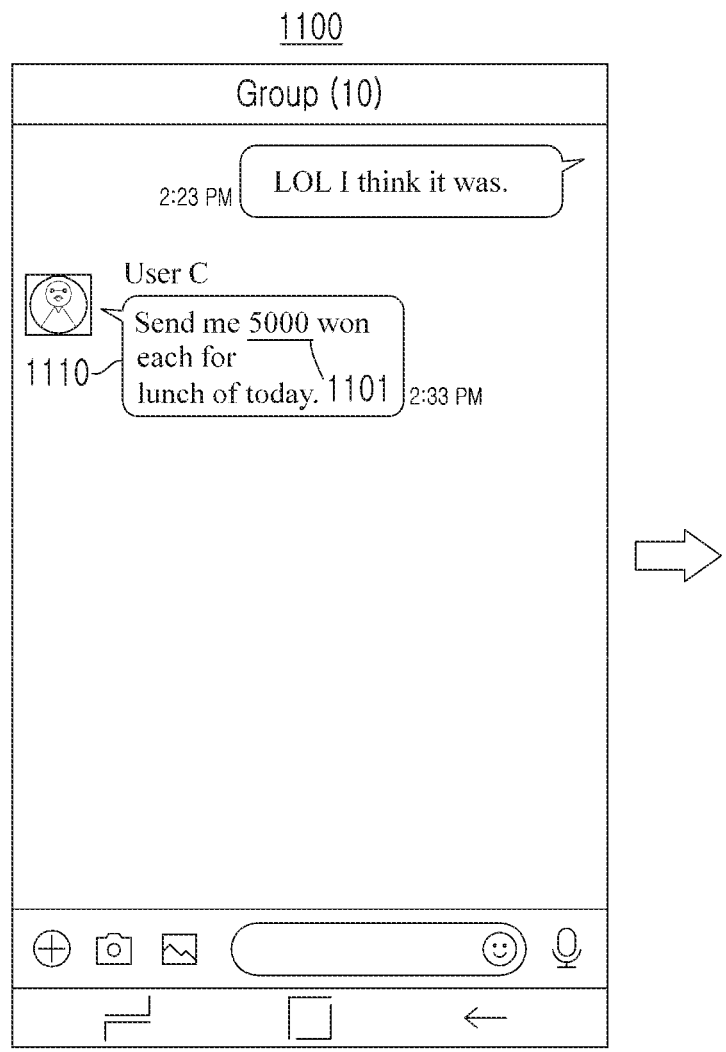
FIGS. 11 and 12 illustrate other examples of processing a remittance according to at least one example embodiment.
Figure 12:
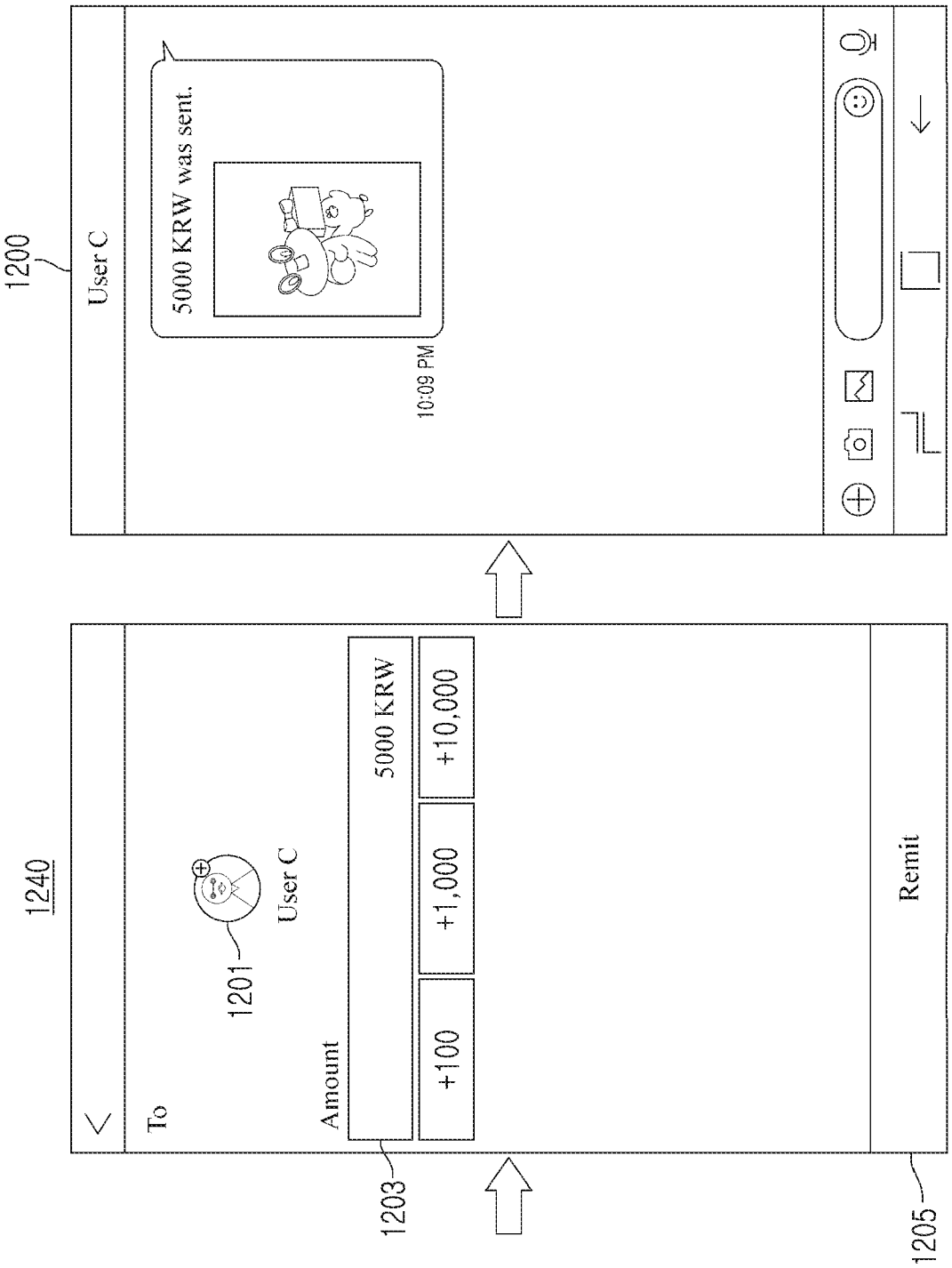

FIGS. 11 and 12 illustrate other examples of performing a remittance according to at least one example embodiment.

FIG. 11 illustrates a messenger chatroom 110 in which 10 users including the user of the electronic device 110 are participating, but the example embodiments are not limited thereto. Here, the messenger chatroom 1100 may be a screen displayed on the electronic device 110, for example, a smartphone.

Referring to FIG. 11, when the user selects a message 1110 including a number 1101 from among messages included in the messenger chatroom 1100, the processor 212 of the electronic device 110 may execute a remittance function immediately by recognizing the number 1101 in the message 1110.

For example, as shown in FIG. 12, when the user selects the message 1110 including the number 1101 in the messenger chatroom 1100, the processor 212 of the electronic device 110 may immediately execute the remittance function and provide a remittance confirmation screen 1240 to confirm remittance information.

The remittance confirmation screen 1240 may be configured as a UI to confirm an amount of money and a remittance target, and may include remittance target information 1201, and an amount input box 1203 to confirm or newly input an amount of money to be transferred. Here, information associated with another user who sent the message 1110 is automatically input into the remittance target information 1201, and the number included in the message 1110 may be input into the amount input box 1203 as an amount of money, and a UI for editing the amount and/or adding a new input amount may be included.

When the user inputs a "remit" UI 1205 on the remittance confirmation screen 1240, the processor 212 of the electronic device 110 may process a remitting transaction to the other user who sent the message 1110 as a remittance target with respect to the amount of money input into the amount input box 1203. The processor 212 of the electronic device 110 may send a remittance message to the other user to receive money in response to the remitting transaction. Here, the remittance message may be displayed in an individual chatroom 1200 with the remittance target. In addition, when the messenger chatroom 1100 is a group chatroom, the remittance message may be displayed in the group chatroom, and even in the group chatroom, the remittance message may be delivered and displayed only to the user of the electronic device 110 and the remittance target.

In the related art, when a chat message received from another user includes a remittance request with respect to an amount of money, the user needs to leave a chatroom, separately execute a remittance function, search for the other user having requested a remittance, select the other user as a remittance target, directly input the amount of money requested, and remit the amount of money, which requires the user to perform many steps for remittance during chatting.

According to some example embodiments, a number included in a chat message received from another user may be regarded as an amount of money, and a remittance function may be executed immediately when the corresponding message is selected. Here, by automatically specifying the other user as a remittance target and automatically inputting the number included in the message as an amount of money, operations for processing a remittance may be reduced.

The systems and/or apparatuses described herein may be implemented using hardware components, software components, and/or a combination thereof. For example, a processing device may be implemented using one or more special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner and loaded with special purpose computer readable instructions corresponding to one or more methods of the example embodiments. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A remittance processing method performed by an electronic device comprising at least one processor configured to execute computer-readable instructions stored in a memory, the remittance processing method comprising:
    generating, by the at least one processor, a user interface (UI) associated with a chatroom of a messenger application of a messenger service, the chatroom including a plurality of users, the plurality of users including a first user and a second user;
    receiving, by the at least one processor, a message being typed by the first user into a message input box of the chatroom UI;
    analyzing, by the at least one processor, content of the message being typed in the message input box before transmitting the message;
    recognizing, by the at least one processor, an amount of money included in the message being typed in the message input box based on results of the analysis before transmitting the message;
    automatically generating, by the at least one processor, a remittance function in response to the amount of money being recognized in the message, the generating including automatically displaying a UI of the remittance function in the chatroom UI without receiving a request for calling the UI of the remittance function from the first user, such that the remittance function is generated immediately, the UI of the remittance function including a user list including the plurality of users in the chatroom;
    receiving, by the at least one processor, at least one remittance target selection on the user list of the UI of the remittance function; and
    processing, by the at least one processor, a remittance transaction to the selected at least one remittance target with respect to the amount of money in response to a remittance request through the UI of the remittance function from the first user on the UI of the remittance function.

2. The remittance processing method of claim 1, wherein the recognizing comprises recognizing the amount of money by recognizing context in the content of the message being typed into the message input box of the chatroom UI.

3. The remittance processing method of claim 1, wherein the recognizing comprises recognizing the amount of money by recognizing a remittance function trigger in the content of the message being typed into the message input box of the chatroom UI, the remittance function trigger including a specific sign or keyword indicating a currency unit in the message.

4. The remittance processing method of claim 1, wherein the generating comprises:
displaying a UI for a remitting transaction in the chatroom UI, the remitting transaction to transfer the amount of money to the remittance target; and
displaying a UI for a remittance requesting transaction in the chatroom UI, the remittance requesting transaction requesting the amount of money from the remittance target.

5. The remittance processing method of claim 4, wherein the chatroom is a group chatroom and includes the plurality of users, the plurality of users including at least three users.

6. The remittance processing method of claim 1, wherein the processing comprises:
selecting the second user in the chatroom as the remittance target, the chatroom being an individual chatroom including the first user and the second user; and
processing a remitting transaction to transfer the amount of money to the specified remittance target, or a remittance requesting transaction to request the amount of money from the specified remittance target.

7. The remittance processing method of claim 1, wherein the processing comprises:
receiving the selection of at least two users of the plurality of users in the chatroom as the remittance target, the chatroom being a group chatroom and including at least three users; and
processing a remitting transaction to transfer the amount of money to the selected remittance target, or a remittance requesting transaction to request the amount of money from the selected remittance target.

8. The remittance processing method of claim 1, further comprising:
receiving, by the at least one processor, a selection by the first user of a specific message from among a plurality of messages included in the chatroom;
generating, by the at least one processor, the remittance function in the chatroom in response to the selected message including a number; and
processing, by the at least one processor, a remittance transaction to a user who sent the selected message as the remittance target with respect to an amount of money corresponding to the number included in the selected message in response to a remittance request from the first user.

9. The remittance processing method of claim 8, further comprising:
hyperlinking, by the at least one processor, the number included in the selected message, the hyperlinking including recognizing the hyperlinked number as the amount of money to be remitted.

10. The remittance processing method of claim 1, further comprising:
receiving, by the at least one processor, a selection by the first user of a specific message from among a plurality of messages included in the chatroom;
generating, by the at least one processor, the remittance function in the chatroom UI based on the selected message; and
processing, by the at least one processor, a remittance transaction to a user who sent the selected message as the remittance target in response to a remittance request from the first user.

11. A non-transitory computer-readable recording medium storing computer-readable instructions that, when executed by at least one processor, cause the at least one processor to perform the remittance processing method of claim 1.

12. The remittance processing method of claim 1, wherein the processing includes:
transmitting, in response to a request from the second user for exchanging a value corresponding to the remittance transaction to real currency, the value corresponding to the remittance transaction to an external financial institution associated with the second user using an account associated with the messenger service established with the external financial institution associated with the second user on a private network associated with the external financial institution, the transmitted value being encrypted.

13. The remittance processing method of claim 1, wherein the automatically generating the remittance function includes:
automatically hiding the UI of the remittance function based on analysis of additional text being typed by the first user into the message input box.

14. An electronic device comprising:
a memory configured to store computer-readable instructions; and
at least one processor configured to connect to the memory and to execute the computer-readable instructions to,
generate a user interface (UI) associated with a chatroom of a messenger application of a messenger service, the chatroom including a plurality of users, the plurality of users including a first user and a second user,
receive a message being typed by the first user into a message input box of the chatroom UI,
analyze content of the message being typed in the message input box before transmitting the message,
recognize an amount of money included in the message being typed in the message input box based on results of the analysis before transmitting the message,
automatically generate a remittance function to the chatroom in response to the amount of money being recognized in the message, the generating including automatically displaying a UI of the remittance function in the chatroom UI without receiving a request for calling the UI of the remittance function from the first user, such that the remittance function is generated immediately, the UI of the remittance function including a user list including the plurality of users in the chatroom,
receive at least one remittance target selection on the user list of the UI of the remittance function, and
process a remittance transaction to the selected at least one remittance target as a remittance target with respect to the amount of money in response to a remittance request through the UI of the remittance function from the first user.

15. The electronic device of claim 14, wherein the at least one processor is further configured to recognize the amount of money by recognizing context in the content of the message being typed into the message input box of the chatroom UI.

16. The electronic device of claim 14, wherein the at least one processor is further configured to:
recognize the amount of money by recognizing a remittance function trigger in the content of the message being typed into the message input box of the chatroom UI, the remittance function trigger including a specific sign or keyword indicating a currency unit in the message.

17. The electronic device of claim 14, wherein the at least one processor is further configured to:
    display a UI for a remitting transaction in the chatroom UI, the remitting transaction to transfer the amount of money to the remittance target; and
    display a UI for a remittance requesting transaction in the chatroom, the remittance requesting transaction requesting the amount of money from the remittance target.

18. The electronic device of claim 17, wherein the at least one processor is further configured to:
    the chatroom is a group chatroom including the plurality of users, the plurality of users including at least three users.

19. The electronic device of claim 14, wherein the at least one processor is further configured to:
    select the second user in the chatroom as the remittance target, the chatroom being an individual chatroom; and
    process a remitting transaction to transfer the amount of money to the specified remittance target, or a remittance requesting transaction to request the amount of money from the specified remittance target.

20. The electronic device of claim 14, wherein the at least one processor is further configured to:
    receive a selection of at least two users of the plurality of users in the chatroom as the remittance target, the chatroom being a group chatroom; and
    process a remitting transaction to transfer the amount of money to the selected remittance target, or a remittance requesting transaction to request the amount of money from the selected remittance target.

21. The electronic device of claim 14, wherein the at least one processor is further configured to:
    receive a selection by the first user of a specific message from among a plurality of messages included in the chatroom;
    generate the remittance function in the chatroom in response to the selected message including a number; and
    process a remittance transaction to a user who sent the selected message as the remittance target with respect to an amount of money corresponding to the number included in the selected message in response to a remittance request from the first user.

22. The electronic device of claim 21, wherein the at least one processor is further configured to:
    hyperlink the number included in the selected message, the hyperlinking including recognizing the hyperlinked number as the amount of money to be remitted.

* * * * *